March 26, 1963 K. M. SCHULZ 3,082,575
CONTAINER ASSEMBLY FOR PLANT HUSBANDRY
Filed Aug. 30, 1961

INVENTOR.
KATHRYN M. SCHULZ
BY
John W. Klooster
ATTORNEY

3,082,575
CONTAINER ASSEMBLY FOR PLANT HUSBANDRY
Kathryn M. Schulz, Hennepin County, Minn.
(7714 Fairfield Road N., Minneapolis 12, Minn.)
Filed Aug. 30, 1961, Ser. No. 134,921
2 Claims. (Cl. 47—37)

This invention relates to plant husbandry and, more particularly, to a pre-seeded ready-to-grow indoor garden container assembly.

Still more particularly, the invention is directed to a container assembly for plant husbandry comprising a pot, a saucerlike tray, and a transparent perforated dome; said pot having a generally larger perimeter about its open top than about its closed base; said tray having inside dimensions such that the bottom of said pot will rest therein, and having outside dimensions such that the top inside wall regions of said pot preferably frictionally engage the outside wall regions of said tray; and said dome having outside dimensions such that its bottom region preferably frictionally engages the top inside wall regions of said pot and also such that said dome when inverted rests inside said tray.

The invention is also particularly directed to a transparent perforated dome used in the aforedescribed container assembly, each of whose perforations has a cross-sectional area in the range from about .75 to 1.4 square centimeters, the ratio of the total number of individual perforations in any given dome to the total air space in cubic centimeters under the dome and within the pot above the level of the growing medium ranging from about $\frac{1}{20}$ to $\frac{1}{50}$, the ratio of such total air space to the inside bottom cross-sectional area of said dome being from about 2.0 to 3.0.

It is an object of this invention to provide a device adapted for utilization as a means in which seeds, bulbs, tubers and other growing media can be prepackaged, stored and shipped.

It is another object of this invention to provide a receptacle suitable for growing plants which is provided with a frictionally engaging transparent perforated dome.

It is a further object of this invention to provide a simple device particularly suitable for the propagation of seeds, and also clippings and young plants, within which humidity conditions are automatically maintained within an optimum range.

It is a still further object of this invention to provide for the top of a container useful in seed and plant propagation a fitted perforated dome element, the size, shape, number and relative locations of the perforatoins in such dome being critically arranged so as to furnish humidity control or the growing environment lying therebelow.

The above and other objects and advantages of the invention will be apparent from consideration of the following description of the invention in conjunction with the accompanying drawings wherein.

Figure 1:
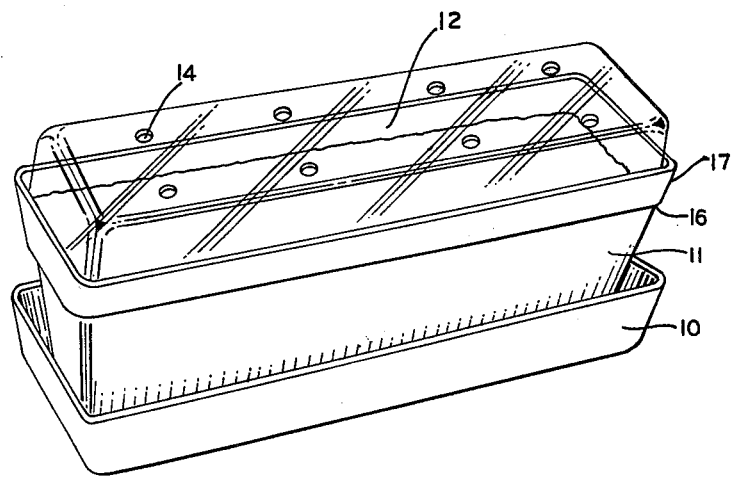
FIGURE 1 is a perspective view showing an embodiment of this invention wherein the three component elements are assembled into a seed germination and plant growing receptacle.

The embodiment depicted in FIG. 1 shows how the growing receptacle of the invention is a container composed of three elements: A pot 11, a saucerlike tray 10, and a perforated transparent dome 12. These elements are constructed with such dimensional interrelationships that they can be combined to form a single unit as shown in FIG. 1.

The pot 11 is so arranged that opposing walls are not parallel but rather slope inwardly in the downward direction toward one another. In cross-section, the walls thus somewhat resemble a section of a wedge. The opposing walls of tray 10 have slopes which are substantially equivalent to those corresponding possessed by the pot walls.

Figure 2:
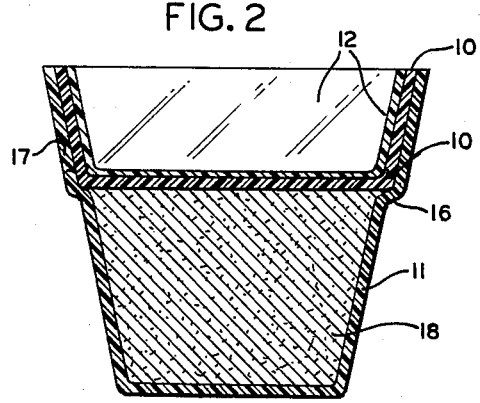
FIGURE 2 is a cross-sectional view of this invention wherein the three component elements of FIG. 1 are re-assembled into a shipping and storage package for seeds and growing media.

The top of the pot has a flange 16 which has a tongue 17 whose height is preferably equal to at least about one-half the depth of tray 10, though in FIGS. 1 and 2 the height of the tongue 17 is about equal to the depth of tray 10. The inside slope of the tongue 17 is at least equal to and preferably slightly greater than the slope of the tray 10 walls.

The base dimensions of the perforated dome 12 are such that the dome 12 fits frictionally upon flange 16, as shown in FIG. 1.

The three elements (pot 11, tray 10 and dome 12) are constructed so that the growing receptacle assembly shown in FIG. 1 can be broken down and reassembled into the shipping and storage package shown in FIG. 2.

To form the packaged container, the transparent dome 12 is removed from its position on top of pot 11 and the saucerlike tray 10 is removed from the bottom of the pot 11. Then, the perforated dome 12 is inverted and placed inside the tray 10. Preferably, the walls of the dome 12 have a slope such that the top of dome 12 when inverted will rest inside the bottom of tray 10. The height of the outside walls of dome 12 are about equal to the inside walls of tray 10, so that the dome 12 when resting inside tray 10 does not protrude above the top of tray 10, thereby affording protection during shipping and storage for the dome 12.

Tray 10 (containing dome 12) is then placed on top of pot 11. Due to the slope of the tongue 17 of flange 16, the tray 10 engages, preferably frictionally, the top of the pot, thereby providing a light compacting pressure upon the surface of a growing medium 18 (and seeds) placed in the base region of the pot 11 and filling same up to the level where the flange 16 lies. Consequently, when the pot is so filled with growing medium and implanted seeds and the tray 10 is inserted into the top of the pot, there results a holding and positioning of the seeds and growing medium, fixing their relative positions with respect to one another.

Thus, the invention provides a device adapted for storing and shipping prepackaged seeds (not shown). The seeds can either be within the growing medium 18 or placed upon the top of same, perhaps even in contact with the bottom of the saucerlike tray 10 when it is engaged with the top of the pot 11 as shown. Hence, the tray 10 serves as a means for holding and positioning the seeds in or on a particular growing medium so that the prepackaged shipping and storage receptacle can be moved about and even jostled without displacing the fixed position of seeds.

This feature of the invention is particularly important in the case of very small seeds because small seeds are planted either under a very thin layer of growing media or else rest even upon the top of the growing media exposed to the atmosphere.

During the shipping and storage of the device containing the dry growing medium and seeds, the tray and dome are in a pressure-tight fitted position in the top of the pot is mentioned above, the tray being disposed next to the growing medium to provide a compacting pressure against the surface of the medium, thereby maintaining the seeds in place as described. Since the tray also seals the device, the contents of the device are kept dry which is of critical importance since an accumulation of moisture therein would effect premature germination of seeds.

The particular growing medium used in any given instance is entirely non-critical from the standpoint of the present invention. However, as those skilled in the art will appreciate, it is frequently desirable to pre-select a growing medium which is best suited for the particular conditions involved in any given situation. Thus, for example, the selection of a growing medium will depend upon such things as cost, seed size, fertilizer, pasteurization, etc.

Naturally, the growing medium as prepackaged is substantially free from moisture. Not only does this save shipping costs by keeping the weight of the prepackaged indoor garden down, but also it provides against premature germination of the seeds.

When it is desired to induce seed germination, the shipping and storage device is broken down from its packaging arrangement and assembled into the growing receptacle configuration shown in FIG. 1. Before the dome 12 is fitted on top of the pot 11, the growing medium 14 is moistened with water.

The elements used as components for the containers of this invention can be formed from any conventional materials. For economic reasons, plastics have been found very convenient construction materials. Indeed, it is preferred to construct the perforated dome of transparent plastic material, thereby permitting the infrared and ultra violet rays of sunlight to penetrate the dome and strike the growing media with its germinating seeds and young plants, for such rays are generally beneficial to the growth of plantlife.

While the foregoing description of the invention has been accomplished in reference to drawings depicting a single embodiment of the invention, it will be appreciated by those skilled in the art that other geometrical configurations employing the principles of this invention can be used for the three component elements. Thus, for example, instead of using a general rectangular construction, an oval or even generally circular arrangement can be employed. In all instances, however, the general slope arrangements of the three component parts and in particular the arrangement of the perforations on the transparent dome will be as explained hereinabove.

Note that the term "closed base" has reference to the fact that the base element has a bottom, but it will be appreciated that this bottom can contain openings, as for drainage, if one so desired. A similar situation prevails with respect to the pot element and its bottom.

I claim:

1. A container assembly for plant husbandry comprising a pot, a saucerlike tray, and a transparent perforated dome; said pot having a generally larger perimeter about its open top than about its closed base; said tray having inside dimensions such that the bottom of said pot will rest therein, and having outside dimensions such that the top inside wall regions of said pot engage the outside wall regions of said tray; and said dome having outside dimensions such that its bottom region engages the top inside wall regions of said pot and also such that said dome when inverted rests inside said tray.

2. A transparent perforated dome for the container of claim 1, each of whose perforations has a cross-sectional area in the range from about .75 to 1.4 square centimeters, the ratio of the total number of individual perforations in any given dome to the total air space in cubic centimeters under the dome and within the pot ranging from about $\frac{1}{20}$ to $\frac{1}{50}$, the ratio of such total air space to the inside bottom cross-sectional area of said dome being from about 2.0 to 3.0.

References Cited in the file of this patent

UNITED STATES PATENTS

| | | |
|---|---|---|
| 1,865,960 | Regelson | July 5, 1932 |
| 2,720,725 | Peerless | Oct. 18, 1955 |
| 2,893,168 | Kobs | July 7, 1959 |
| 2,957,274 | Colvin | Oct. 25, 1960 |